United States Patent
Wang

(10) Patent No.: US 12,538,300 B2
(45) Date of Patent: Jan. 27, 2026

(54) METHODS, BASE STATION AND TERMINAL DEVICE FOR UPLINK TRANSMISSION

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 444 days.

(21) Appl. No.: 18/010,215

(22) PCT Filed: May 14, 2021

(86) PCT No.: PCT/EP2021/062835
§ 371 (c)(1),
(2) Date: Dec. 14, 2022

(87) PCT Pub. No.: WO2021/254700
PCT Pub. Date: Dec. 23, 2021

(65) Prior Publication Data
US 2023/0362923 A1      Nov. 9, 2023

(30) Foreign Application Priority Data

Jun. 17, 2020   (WO) ............... PCT/EP2020/066716

(51) Int. Cl.
*H04W 72/232*   (2023.01)
*H04W 72/1268*  (2023.01)

(52) U.S. Cl.
CPC ..... *H04W 72/1268* (2013.01); *H04W 72/232* (2023.01)

(58) Field of Classification Search
CPC .......... H04W 72/1268; H04W 72/232; H04W 72/20; H04W 72/23; H04W 72/569; H04L 1/1864; H04L 5/0053; H04L 5/0096
USPC ................................................. 370/329-330
See application file for complete search history.

(56) References Cited

U.S. PATENT DOCUMENTS

| | | | |
|---|---|---|---|
| 2018/0368133 A1* | 12/2018 | Park ................ | H04L 5/0064 |
| 2019/0394785 A1* | 12/2019 | He .................. | H04L 1/0023 |
| 2020/0092913 A1  | 3/2020  | Xu et al. | |
| 2020/0314888 A1* | 10/2020 | Kolding ........... | H04W 72/23 |

(Continued)

FOREIGN PATENT DOCUMENTS

| | | |
|---|---|---|
| WO | 2019245446 A1 | 12/2019 |
| WO | 2019246285 A1 | 12/2019 |

OTHER PUBLICATIONS

Author Unknown, "Technical Specification Group Radio Access Network; Study on Scenarios and Requirements for Next Generation Access Technologies; (Release 15)," Technical Report 38.913, Version 15.0.0, Jun. 2018, 3GPP Organizational Partners, 39 pages.

(Continued)

*Primary Examiner* — Candal Elpenord
(74) *Attorney, Agent, or Firm* — Withrow & Terranova, PLLC

(57) ABSTRACT

Methods, a base station and a terminal device are disclosed for uplink transmission. According to an embodiment, the base station sends, to a terminal device served by the base station, a signaling comprising one or more uplink grants. The signaling indicates which service or services are allowed to use the one or more uplink grants.

18 Claims, 12 Drawing Sheets

(56) References Cited

U.S. PATENT DOCUMENTS

2020/0351915 A1* 11/2020 Zhao .................... H04W 72/23
2022/0078768 A1*  3/2022 El Hamss ............. H04L 1/1812
2022/0394752 A1* 12/2022 Baek .................... H04W 72/21

OTHER PUBLICATIONS

Author Unknown, "Technical Specification Group Radio Access Network; NR; Medium Access Control (MAC) protocol specification (Release 16)," Technical Specification 38.321, Version 16.0.0, Mar. 2020, 3GPP Organizational Partners, 141 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 832 pages.
Intel Corporation, "RP-193259: New SID: Study on supporting NR from 52.6 GHz to 71 Ghz," 3GPP TSG RAN Meeting #86, Dec. 9-12, 2019, Sitges, Spain, 3 pages.
Popovski, et al., "5G Wireless Network Slicing for eMBB, URLLC, and mMTC: A Communication-Theoretic View," IEEE Access, vol. 6, Aug. 2018, 32 pages.
Vivo, "R1-1908164: Other issues for URLLC," 3GPP TSG RAN WG1 #98, Aug. 26-30, 2019, Prague, Czech Republic, 9 pages.
International Search Report and Written Opinion for International Patent Application No. PCT/EP2021/062835, mailed Aug. 26, 2021, 17 pages.
Examination Report for European Patent Application No. 21724341.9, mailed May 14, 2024, 12 pages.

\* cited by examiner

Send, to a terminal device served by the base station, a signaling comprising one or more uplink grants, wherein the signaling indicates or implies which service or services are allowed to use the one or more uplink grants — 404

METHODS, BASE STATION AND TERMINAL DEVICE FOR UPLINK TRANSMISSION

This application is a 35 U.S.C. § 371 national phase filing of International Application No. PCT/EP2021/062835, filed May 14, 2021, which claims the benefit of International Application No. PCT/EP2020/066716, filed Jun. 17, 2020, the disclosures of which are incorporated herein by reference in their entireties.

TECHNICAL FIELD

Embodiments of the disclosure generally relate to wireless communication, and, more particularly, to methods, a base station and a terminal device for uplink transmission.

BACKGROUND

This section introduces aspects that may facilitate better understanding of the present disclosure. Accordingly, the statements of this section are to be read in this light and are not to be understood as admissions about what is in the prior art or what is not in the prior art.

Mobile broadband will continue to drive the demands for higher overall traffic capacity and higher achievable end-user data rates in wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. The wide transmission bandwidths needed to provide data rates up to 10 Gbps and above can likely only be obtained from spectrum allocations in the millimeter-wave band. High-gain beamforming, typically realized with array antennas, can be used to mitigate the increased pathloss at higher frequencies. Such networks may be referred to as new radio (NR) systems.

NR supports a diverse set of use cases and a diverse set of deployment scenarios. The latter includes deployment at both low frequencies (hundreds of MHz), and very high frequencies (tens of GHz). Two operation frequency ranges (FRs) are defined in NR release 15 (Rel-15): FR1 from 410 MHz to 7125 MHz and FR2 from 24.250 GHz to 52.6 GHz. The 3rd generation partnership project (3GPP) radio access network (RAN) is currently (NR Rel-17) studying how to best support NR operation on FR2 frequencies, i.e. from 52.6 GHz to 71 GHz, as described in RP-193259, "3GPP Work Item Description: Study on supporting NR from 52.6 GHz to 71 GHz".

Similar to long term evolution (LTE), NR uses orthogonal frequency division multiplexing (OFDM) in the downlink (i.e. from a network node, e.g. a base station such as a next generation node B (gNB), an evolved node B (eNB), to a user equipment (UE)). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing (SCS) values are supported in NR. The supported subcarrier spacing values (also referred to as different numerologies) are given by $\Delta f = (15 \times 2^\mu)$ kHz, where $\mu \in (0,1,2,3,4)$. $\Delta f = 15$ kHz is the basic (or reference) subcarrier spacing that is also used in LTE.

In the time domain, downlink and uplink transmissions in NR will be organized into equally-sized subframes of 1 ms each similar to LTE. A subframe is further divided into multiple slots of equal duration. The slot length for subcarrier spacing $\Delta f = (15 \times 2^\mu)$ kHz is $\frac{1}{2}^\mu$ ms. There is only one slot per subframe for $\Delta f = 15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on physical downlink control channel (PDCCH) and data is carried on physical downlink shared channel (PDSCH). A UE first detects and decodes PDCCH and if a PDCCH is decoded successfully, it then decodes the corresponding PDSCH based on the downlink assignment provided by decoded control information in the PDCCH. In addition to PDCCH and PDSCH, there are also other channels and reference signals transmitted in the downlink, including synchronization signal block (SSB), channel state information reference signal (CSI-RS), etc.

Uplink data transmissions, carried on physical uplink shared channel (PUSCH), can also be dynamically scheduled by the gNB by transmitting a DCI. The DCI (which is transmitted in the downlink (DL) region) always indicates a scheduling time offset so that the PUSCH is transmitted in a slot in the uplink (UL) region.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for uplink transmission. In particular, one of the problems to be solved by the disclosure is that the existing multiplexing functionality performed by UE medium access control (MAC) may have certain improper impact on quality of service (QoS) differentiation.

According to a first aspect of the disclosure, there is provided a method performed by a base station. The method may comprise sending, to a terminal device served by the base station, a signaling comprising one or more uplink grants. The signaling may indicate or imply which service or services are allowed to use the one or more uplink grants.

In this way, service specific scheduling can be supported to control the multiplexing functionality performed by the terminal device.

In an embodiment of the disclosure, a number of the one or more uplink grants may be more than one. At least two of the more than one uplink grants may be used by different services.

In an embodiment of the disclosure, each of the service or services allowed to use the one or more uplink grants is associated with a logical channel or logical channel group.

In an embodiment of the disclosure, the signaling may be a dynamic scheduling signaling.

In an embodiment of the disclosure, the dynamic scheduling signaling may be a downlink control information (DCI).

In an embodiment of the disclosure, the signaling may be a configured grant signaling.

In an embodiment of the disclosure, the configured grant signaling may be a radio resource control (RRC) signaling.

In an embodiment of the disclosure, the configured grant signaling may be a DCI activation signaling.

In an embodiment of the disclosure, the signaling may imply that all services are allowed to use the one or more uplink grants, by an absence of one or more indicators indicating which service or services are allowed to use the one or more uplink grants.

In an embodiment of the disclosure, the signaling may comprise one or more indicators indicating which service or services are allowed to use the one or more uplink grants.

In an embodiment of the disclosure, one of the one or more indicators may indicate a specific service that is allowed to use the one or more uplink grants.

In an embodiment of the disclosure, a number of the one or more indicators may be one. The one indicator may indicate that all services are allowed to use the one or more uplink grants.

In an embodiment of the disclosure, the one indicator may be an index of an entry in a table preconfigured to the terminal device. The table may contain all services configured to the terminal device.

In an embodiment of the disclosure, the table may be preconfigured to the terminal device via one of: system information; dedicated RRC signaling; MAC control element (CE); and being hardcoded in the terminal device.

In an embodiment of the disclosure, one of the one or more indicators may indicate multiple services that are allowed to use one of the one or more uplink grants.

In an embodiment of the disclosure, the one indicator may be a bitmap comprising multiple bits. For each of the multiple services, there may be a corresponding bit in the bitmap.

In an embodiment of the disclosure, the bit with a value of 1 may indicate that the corresponding service is allowed to use the one uplink grant. The bit with a value of 0 may indicate that the corresponding service is not allowed to use the one uplink grant.

In an embodiment of the disclosure, a number of the one or more uplink grants may be more than one. Each of the one or more indicators may be associated with one of the more than one uplink grants and indicate which service or services are allowed to use the uplink grant.

In an embodiment of the disclosure, the method may further comprise performing link adaptation independently for different services for the terminal device.

According to a second aspect of the disclosure, there is provided a method performed by a terminal device. The method may comprise receiving, from a base station serving the terminal device, a signaling comprising one or more uplink grants. The signaling may indicate or imply which service or services are allowed to use the one or more uplink grants. The method may further comprise performing an uplink transmission to the base station based on the signaling.

In this way, service specific scheduling can be supported to control the multiplexing functionality performed by the terminal device.

In an embodiment of the disclosure, a number of the one or more uplink grants may be more than one. At least two of the more than one uplink grants may be used by different services.

In an embodiment of the disclosure, each of the service or services allowed to use the one or more uplink grants is associated with a logical channel or logical channel group.

In an embodiment of the disclosure, performing the uplink transmission may comprise determining, from the indicated or implied service or services, at least one target service which is to be allocated with resources indicated by the one or more uplink grants.

In an embodiment of the disclosure, the signaling may indicate that a specific service is allowed to use the one or more uplink grants. The specific service may be determined as the at least one target service.

In an embodiment of the disclosure, the signaling may indicate that multiple services are allowed to use the one or more uplink grants. The at least one target service may be determined by performing logical channel prioritization (LCP) procedure on the multiple services.

In an embodiment of the disclosure, the signaling may indicate or imply that all services are allowed to use the one or more uplink grants. The at least one target service may be determined by performing LCP procedure on the all services.

In an embodiment of the disclosure, a number of the at least one target service may be more than one. Performing the uplink transmission may comprise performing power control independently for different target services in the more than one target services.

In an embodiment of the disclosure, the signaling may be a dynamic scheduling signaling.

In an embodiment of the disclosure, the dynamic scheduling signaling may be a DCI.

In an embodiment of the disclosure, the signaling may be a configured grant signaling.

In an embodiment of the disclosure, the configured grant signaling may be an RRC signaling.

In an embodiment of the disclosure, the configured grant signaling may be a DCI activation signaling.

In an embodiment of the disclosure, the signaling may imply that all services are allowed to use the one or more uplink grants, by an absence of one or more indicators indicating which service or services are allowed to use the one or more uplink grants.

In an embodiment of the disclosure, the signaling may comprise one or more indicators indicating which service or services are allowed to use the one or more uplink grants.

In an embodiment of the disclosure, one of the one or more indicators may indicate a specific service that is allowed to use the one or more uplink grants.

In an embodiment of the disclosure, a number of the one or more indicators may be one. The one indicator may indicate that all services are allowed to use the one or more uplink grants.

In an embodiment of the disclosure, the indicator may be an index of an entry in a table preconfigured to the terminal device. The table may contain all services configured to the terminal device.

In an embodiment of the disclosure, the table may be preconfigured to the terminal device via one of: system information; dedicated RRC signaling; MAC CE; and being hardcoded in the terminal device.

In an embodiment of the disclosure, one of the one or more indicators may indicate multiple services that are allowed to use one of the one or more uplink grants.

In an embodiment of the disclosure, the one indicator may be a bitmap comprising multiple bits. For each of the multiple services, there may be a corresponding bit in the bitmap.

In an embodiment of the disclosure, the bit with a value of 1 may indicate that the corresponding service is allowed to use the one uplink grant. The bit with a value of 0 may indicate that the corresponding service is not allowed to use the one uplink grant.

In an embodiment of the disclosure, a number of the one or more uplink grants may be more than one. Each of the one or more indicators may be associated with one of the more than one uplink grants and indicate which service or services are allowed to use the uplink grant.

According to a third aspect of the disclosure, there is provided a base station. The base station may comprise at least one processor and at least one memory. The at least one memory may contain instructions executable by the at least one processor, whereby the base station may be operative to send, to a terminal device served by the base station, a signaling comprising one or more uplink grants. The signaling may indicate or imply which service or services are allowed to use the one or more uplink grants.

In an embodiment of the disclosure, the base station may be operative to perform the method according to the above first aspect.

According to a fourth aspect of the disclosure, there is provided a terminal device. The terminal device may comprise at least one processor and at least one memory. The at least one memory may contain instructions executable by the at least one processor, whereby the terminal device may be operative to receive, from a base station serving the terminal device, a signaling comprising one or more uplink grants. The signaling may indicate or imply which service or services are allowed to use the one or more uplink grants. The terminal device may be further operative to perform an uplink transmission to the base station based on the signaling.

In an embodiment of the disclosure, the terminal device may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a base station. The base station may comprise a sending module for sending, to a terminal device served by the base station, a signaling comprising one or more uplink grants. The signaling may indicate or imply which service or services are allowed to use the one or more uplink grants.

According to an eighth aspect of the disclosure, there is provided a terminal device. The terminal device may comprise a reception module for receiving, from a base station serving the terminal device, a signaling comprising one or more uplink grants. The signaling may indicate or imply which service or services are allowed to use the one or more uplink grants. The terminal device may further comprise a transmission module for performing an uplink transmission to the base station based on the signaling.

According to a ninth aspect of the disclosure, there is provided a method implemented in a communication system including a base station and a terminal device. The method may comprise, at the base station, sending, to the terminal device served by the base station, a signaling comprising one or more uplink grants. The signaling may indicate or imply which service or services are allowed to use the one or more uplink grants. The method may further comprise, at the terminal device, receiving, from the base station, the signaling comprising the one or more uplink grants. The signaling may indicate or imply which service or services are allowed to use the one or more uplink grants. The method may further comprise, at the terminal device, performing an uplink transmission to the base station based on the signaling.

According to a tenth aspect of the disclosure, there is provided a communication system. The communication system may comprise a base station configured to send, to a terminal device served by the base station, a signaling comprising one or more uplink grants. The signaling may indicate or imply which service or services are allowed to use the one or more uplink grants. The communication system may further comprise the terminal device configured to: receive, from the base station, the signaling comprising the one or more uplink grants, wherein the signaling indicates or implies which service or services are allowed to use the one or more uplink grants; and perform an uplink transmission to the base station based on the signaling.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
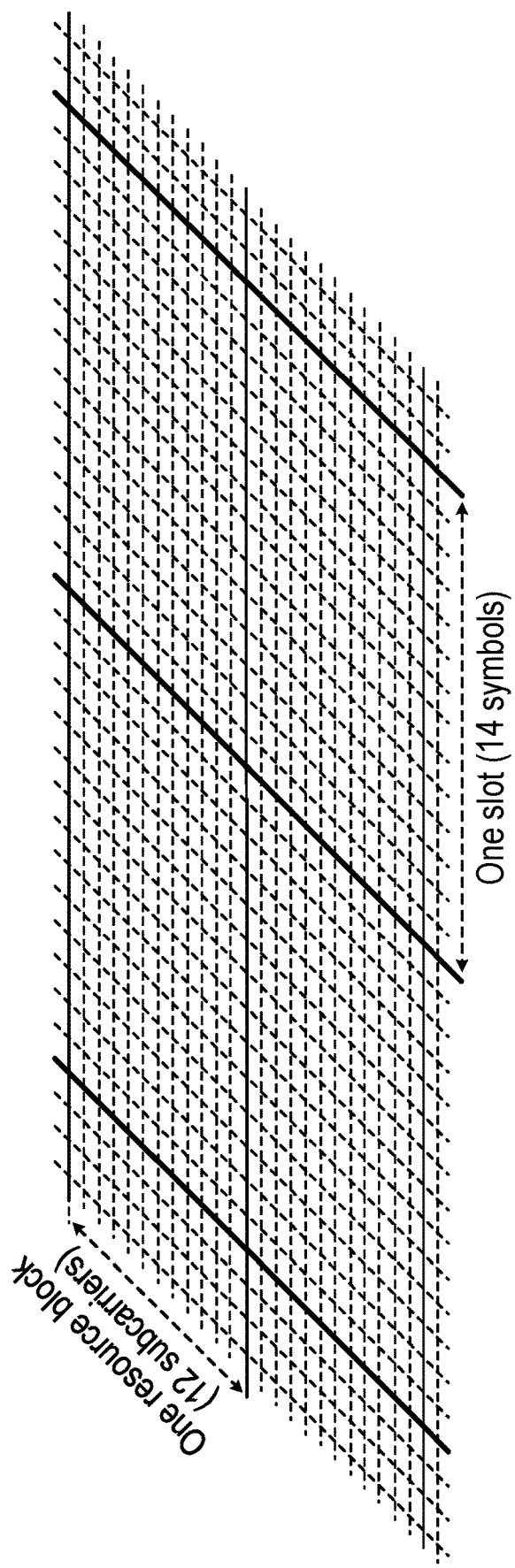
FIG. 1 is a diagram illustrating NR physical resource grid.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As described in 3GPP TS 38.321 V16.0.0, clause 5.4.3.1, the logical channel prioritization (LCP) procedure is applied whenever a new transmission is performed. Specifically, radio resource control (RRC) controls the scheduling of uplink data by signalling for each logical channel per medium access control (MAC) entity:

priority where an increasing priority value indicates a lower priority level;
   prioritisedBitRate which sets the Prioritized Bit Rate (PBR);
   bucketSizeDuration which sets the Bucket Size Duration (BSD).

RRC additionally controls the LCP procedure by configuring mapping restrictions for each logical channel allowedSCS-List which sets the allowed Subcarrier Spacing(s) for transmission;
   maxPUSCH-Duration which sets the maximum PUSCH duration allowed for transmission;
   configuredGrantType1Allowed which sets whether a configured grant Type 1 can be used for transmission;
   allowedServingCells which sets the allowed cell(s) for transmission;
   allowedCG-List which sets the allowed configured grant(s) for transmission;
   allowedPHY-PriorityIndex which sets the allowed PHY priority index(es) of a dynamic grant for transmission.

The following UE variable is used for the Logical channel prioritization procedure:

Bj which is maintained for each logical channel j.

The MAC entity shall initialize Bj of the logical channel to zero when the logical channel is established. For each logical channel j, the MAC entity shall:

1> increment Bj by the product PBR×T before every instance of the LCP procedure, where T is the time elapsed since Bj was last incremented;
   1> if the value of Bj is greater than the bucket size (i.e. PBR×BSD):
      2>set Bj to the bucket size.

Note that the exact moment(s) when the UE updates Bj between LCP procedures is up to UE implementation, as long as Bj is up to date at the time when a grant is processed by LCP.

With respect to selection of logical channels, the MAC entity shall, when a new transmission is performed:

1> select the logical channels for each UL grant that satisfy all the following conditions:

2>the set of allowed Subcarrier Spacing index values in allowedSCS-List, if configured, includes the Subcarrier Spacing index associated to the UL grant; and
      2>maxPUSCH-Duration, if configured, is larger than or equal to the PUSCH transmission duration associated to the UL grant; and
      2>configuredGrantType1Allowed, if configured, is set to true in case the UL grant is a Configured Grant Type 1; and
      2>allowedServingCells, if configured, includes the Cell information associated to the UL grant. Does not apply to logical channels associated with a DRB configured with PDCP duplication within the same MAC entity (i.e. CA duplication) for which PDCP duplication is deactivated; and
      2>allowedCG-List, if configured, includes the configured grant index associated to the UL grant; and
      2>allowedPHY-PriorityIndex, if configured, includes the priority index associated to the dynamic UL grant.

Note that the Subcarrier Spacing index, PUSCH transmission duration, Cell information, and priority index are included in Uplink transmission information received from lower layers for the corresponding scheduled uplink transmission.

With respect to allocation of resources, the MAC entity shall, when a new transmission is performed:

1> allocate resources to the logical channels as follows:
      2> logical channels selected in clause 2.1.3.2 for the UL grant with Bj>0 are allocated resources in a decreasing priority order. If the PBR of a logical channel is set to infinity, the MAC entity shall allocate resources for all the data that is available for transmission on the logical channel before meeting the PBR of the lower priority logical channel(s);
      2> decrement Bj by the total size of MAC SDUs served to logical channel j above;
      2> if any resources remain, all the logical channels selected in clause 2.1.3.2 are served in a strict decreasing priority order (regardless of the value of Bj) until either the data for that logical channel or the UL grant is exhausted, whichever comes first. Logical channels configured with equal priority should be served equally.

Note that the value of Bj can be negative.

If the MAC entity is requested to simultaneously transmit multiple MAC PDUs, or if the MAC entity receives the multiple UL grants within one or more coinciding PDCCH occasions (i.e. on different Serving Cells), it is up to UE implementation in which order the grants are processed. The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;
   if the UE segments an RLC SDU from the logical channel, it shall maximize the size of the segment to fill the grant of the associated MAC entity as much as possible;
   the UE should maximise the transmission of data;
   if the MAC entity is given a UL grant size that is equal to or larger than 8 bytes while having data available and allowed (according to clause 2.1.3) for transmission, the MAC entity shall not transmit only padding BSR and/or padding.

The MAC entity shall not generate a MAC PDU for the HARQ entity if the following conditions are satisfied:
  the MAC entity is configured with skip UplinkTxDynamic with value true and the grant indicated to the HARQ entity was addressed to a C-RNTI, or the grant indicated to the HARQ entity is a configured uplink grant; and
  there is no aperiodic CSI requested for this PUSCH transmission; and
  the MAC PDU includes zero MAC SDUs; and
  the MAC PDU includes only the periodic BSR and there is no data available for any LCG, or the MAC PDU includes only the padding BSR.
Logical channels shall be prioritised in accordance with the following order (highest priority listed first):
  C-RNTI MAC CE or data from UL-CCCH;
  Configured Grant Confirmation MAC CE or BFR MAC CE or Multiple Entry Configured Grant Confirmation MAC CE;
  Sidelink Configured Grant Confirmation MAC CE;
  LBT failure MAC CE;
  MAC CE for SL-BSR prioritized;
  MAC CE for BSR, with exception of BSR included for padding;
  Single Entry PHR MAC CE or Multiple Entry PHR MAC CE;
  MAC CE for the number of Desired Guard Symbols;
  MAC CE for Pre-emptive BSR;
  MAC CE for SL-BSR, with exception of SL-BSR prioritized and SL-BSR included for padding;
  data from any Logical Channel, except data from UL-CCCH;
  MAC CE for Recommended bit rate query;
  MAC CE for BSR included for padding;
  MAC CE for SL-BSR included for padding.
Note that Prioritization between Configured Grant Confirmation MAC CE and BFR MAC CE is up to UE implementation.

With respect to multiplexing of MAC Control Elements and MAC SDUs, the MAC entity shall multiplex MAC CEs and MAC SDUs in a MAC PDU according to clause 2.1.3. Note that content of a MAC PDU does not change after being built for transmission on a dynamic uplink grant, regardless of LBT outcome.

In NR, configured scheduling is used to allocate semi-static periodic assignments or grants for a UE. For uplink, there are two types of configured scheduling schemes: Type 1 and Type 2. For Type 1, configured grants are configured via RRC signaling only. For Type 2, similar configuration procedure as SPS UL in LTE was defined, i.e. some parameters are preconfigured via RRC signaling and some physical layer parameters are configured via MAC scheduling procedure. The detail procedures can be found in 3GPP TS 38.321 V16.0.0, clause 5.8.2.

Like for SPS in LTE, the configured grant (CG) periodicity is RRC configured, and this is specified in the ConfiguredGrantConfig IE. Different periodicity values are supported in NR depending on the subcarrier spacing. For example, for 15 and 30 kHz SCS, the following periodicities are supported, expressed in a number of OFDM symbols:
  15 kHz SCS
    2, 7, and n*14 OFDM symbols
      where $n \in \{1, 2, 4, 5, 8, 10, 16, 20, 32, 40, 64, 80, 128, 160, 320, 640\}$
  30 kHz SCS
    2, 7, and n*14 OFDM symbols
      where $n \in \{1, 2, 4, 5, 8, 10, 16, 20, 32, 40, 64, 80, 128, 160, 256, 320, 640, 1280\}$ For Type1 configured grants, in addition to the periodicity, the time domain allocation of PUSCH is configured purely via RRC signalling:
  timeDomainOffset: Provides a slot offset with respect to SFN 0
  timeDomainAllocation: Provides an index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

For the case of Type2 configured grants, the periodicity is configured by RRC in the same way as for Type1, but the slot offset is dynamically indicated and is given by the slot in which the UE receives the DCI that activates the Type2 configured grant. In contrast to Type1, the time domain allocation of PUSCH is indicated dynamically by DCI via the time domain resource assignment field in the same way as for scheduled (non-CG) PUSCH. This DCI field indexes a table of start symbol and length (SLIV) values. The detailed configuration details of the RRC specification (i.e., 3GPP TS 38.331 V 16.0.0) for configured grant are illustrated as below.

Rel-16 ConfiguredGrantConfig IE in the RRC specification.

```
-- ASN1START
-- TAG-CONFIGUREDGRANTCONFIG-START
ConfiguredGrantConfig ::=              SEQUENCE {
  frequencyHopping                       ENUMERATED {intraSlot, interSlot}                          OPTIONAL,   -- Need S
  cg-DMRS-Configuration                  DMRS-UplinkConfig,
  mcs-Table                              ENUMERATED {qam256, qam64LowSE}                            OPTIONAL,   -- Need S
  mcs-TableTransformPrecoder             ENUMERATED {qam256, qam64LowSE}                            OPTIONAL,   -- Need S
  uci-OnPUSCH                            SetupRelease { CG-UCI-OnPUSCH }                            OPTIONAL,   -- Need M
  resourceAllocation                     ENUMERATED { resourceAllocationType0, resourceAllocationType1,
dynamicSwitch },
  rbg-Size                               ENUMERATED {config2}                                       OPTIONAL,   -- Need S
  powerControlLoopToUse                  ENUMERATED {n0, n1},
  p0-PUSCH-Alpha                         P0-PUSCH-AlphaSetId,
  transformPrecoder                      ENUMERATED {enabled, disabled}                             OPTIONAL,   -- Need S
  nrofHARQ-Processes                     INTEGER(1..16),
  repK                                   ENUMERATED {n1, n2, n4, n8},
  repK-RV                                ENUMERATED {s1-0231, s2-0303, s3-0000}                     OPTIONAL,   -- Need R
  periodicity                            ENUMERATED {
    sym2, sym7, sym1x14, sym2x14, sym4x14, sym5x14, sym8x14, sym10x14,
sym16x14, sym20x14, sym32x14, sym40x14, sym64x14, sym80x14, sym128x14, sym160x14, sym256x14, sym320x14,
sym512x14, sym640x14, sym1024x14, sym1280x14, sym2560x14, sym5120x14, sym6, sym1x12, sym2x12, sym4x12, sym5x12,
```

-continued

Rel-16 ConfiguredGrantConfig IE in the RRC specification.

```
sym8x12, sym10x12, sym16x12, sym20x12, sym32x12,
sym40x12, sym64x12, sym80x12, sym128x12, sym160x12, sym256x12, sym320x12, sym512x12, sym640x12, sym1280x12,
sym2560x12 },
    configuredGrantTimer                    INTEGER (1..64)                                      OPTIONAL,  -- Need R
    rrc-ConfiguredUplinkGrant               SEQUENCE {
        timeDomainOffset                    INTEGER (0..5119),
        timeDomainAllocation                INTEGER   (0..15),
        frequencyDomainAllocation           BIT STRING (SIZE (18)),
        antennaPort                         INTEGER (0..31),
        dmrs-SeqInitialization              INTEGER (0..1)                                       OPTIONAL,  -- Need R
        precodingAndNumberOf Layers         INTEGER (0..63),
        srs-ResourceIndicator               INTEGER (0..15)                                      OPTIONAL,  -- Need R
        mcsAndTBS                           INTEGER (0..31),
        frequencyHoppingOffset              INTEGER (1..maxNrofPhysicalResourceBlocks-1)             OPTIONAL,  --
Need R
        pathlossReferenceIndex              INTEGER (0..maxNrofPUSCH-PathlossReferenceRSs-1),
        ...,
        [[
        pusch-RepTypeIndicator-r16          ENUMERATED {pusch-RepTypeA, pusch-RepTypeB}           OPTIONAL,  -- Need M
        frequencyHoppingPUSCH-RepTypeB-r16  ENUMERATED {interRepetition, interSlot}               OPTIONAL, -- Cond
RepTypeB
        timeReferenceSFN-r16                ENUMERATED { sfn512}                                  OPTIONAL  -- Need R
        ]]                                                                                       OPTIONAL,  -- Need R
    }
    ...,
    [[
    cg-RetransmissionTimer-r16              INTEGER (1..64)                                      OPTIONAL,  -- Need R
    cg-minDFI-Delay-r16                     INTEGER (1..ffsValue)                                OPTIONAL,  -- Need R Upper
limit 7 FFS
    cg-nrofPUSCH-InSlot-r16                 INTEGER (1..ffsValue)                                OPTIONAL,  -- Need R
    cg-nrofSlots-r16                        INTEGER (1..ffsValue)                                OPTIONAL,  -- Need R
    cg-StartingFullBW-InsideCOT-r16         ENUMERATED {ffs}                                     OPTIONAL,  -- Need R
    cg-StartingFullBW-OutsideCOT-r16        ENUMERATED {ffs}                                     OPTIONAL,  -- Need R
    cg-StartingPartialBW-InsideCOT-r16      ENUMERATED {ffs}                                     OPTIONAL,  -- Need R
    cg-StartingPartialBW-OutsideCOT-r16     ENUMERATED {ffs}                                     OPTIONAL,  -- Need R
    cg-UCI-Multiplexing                     ENUMERATED {enabled}                                 OPTIONAL,  -- Need R
    cg-COT-SharingOffset-r16                INTEGER (1..ffsValue)                                OPTIONAL,  -- Need R
    betaOffsetCG-UCI-r16                    INTEGER (1..ffsValue)                                OPTIONAL,  -- Need R
    cg-COT-SharingList-r16                  SEQUENCE (SIZE (1..ffsValue)) OF CG-COT-Sharing-r16     OPTIONAL,  --
Need R
    harq-ProcID-Offset-r16                  INTEGER (0..15)                                      OPTIONAL,  -- Need M
    harq-ProcID-Offset2-r16                 INTEGER (0..15)                                      OPTIONAL,  -- Need M
    configuredGrantConfigIndex-r16          ConfiguredGrantConfigIndex-r16                       OPTIONAL,  -- Need M
    configuredGrantConfigIndexMAC-r16       ConfiguredGrantConfigIndexMAC-r16                    OPTIONAL,  -- Need M
    periodicityExt-r16                      INTEGER (1..5120)                                    OPTIONAL,  -- Need M
    startingFromRV0-r16                     ENUMERATED {on, off}                                 OPTIONAL,  -- Need M
    phy-PriorityIndex-r16                   ENUMERATED {p0, p1}                                  OPTIONAL,  -- Need M
    autonomousReTx-r16                      ENUMERATED {enabled}                                 OPTIONAL   -- Cond LCH-
BasedPrioritization
    ]]
}
```

Compared to Configured UL framework in NR Rel-15, a UE can trigger a retransmission autonomously using a configured grant for a HARQ process configured with autonomous uplink (AUL) when the CG retransmission timer is expired while the UE has not received HARQ feedback for the HARQ process. A timer "CG retransmission timer (CGRT)" is defined accordingly. This timer is configured by the RRC parameter cg-Retransmission Timer in the ConfiguredGrantConfig. The CGRT is started for a HARQ process configured with AUL upon the data transmission using a configured grant, and a retransmission using another configured grant is triggered when the CGRT expires.

With this added functionality, it is beneficial for the UE to avoid the HARQ process to be stalled in case the gNB has missed the HARQ transmission initiated by the UE. However, an issue is observed that a UE may just continuously initiate autonomous HARQ retransmissions for a HARQ process for a very long time. However, the gNB may not successfully receive the TB either due to bad radio channel quality or the channel is seldom obtained due to LBT failures. This is certainly not desirable because the packet may become too old and any retransmission attempt would just further congest the channel and further affect the latency of other packets in the UL buffer. The RLC layer at the UE may sooner or later trigger RLC retransmissions for a RLC PDU which is still under retransmissions in the HARQ. The retransmitted RLC PDU would occupy a different HARQ process. In this case, the UE would then maintain two HARQ processes in transmission for the same RLC PDU. The RLC receiver at the gNB may receive two RLC PDU duplicates. This may create a trouble in case a wraparound of the RLC sequence number occurs. The second received RLC PDU may be treated as a new data and forwarded upward instead the PDU should be dropped.

Figure 2:
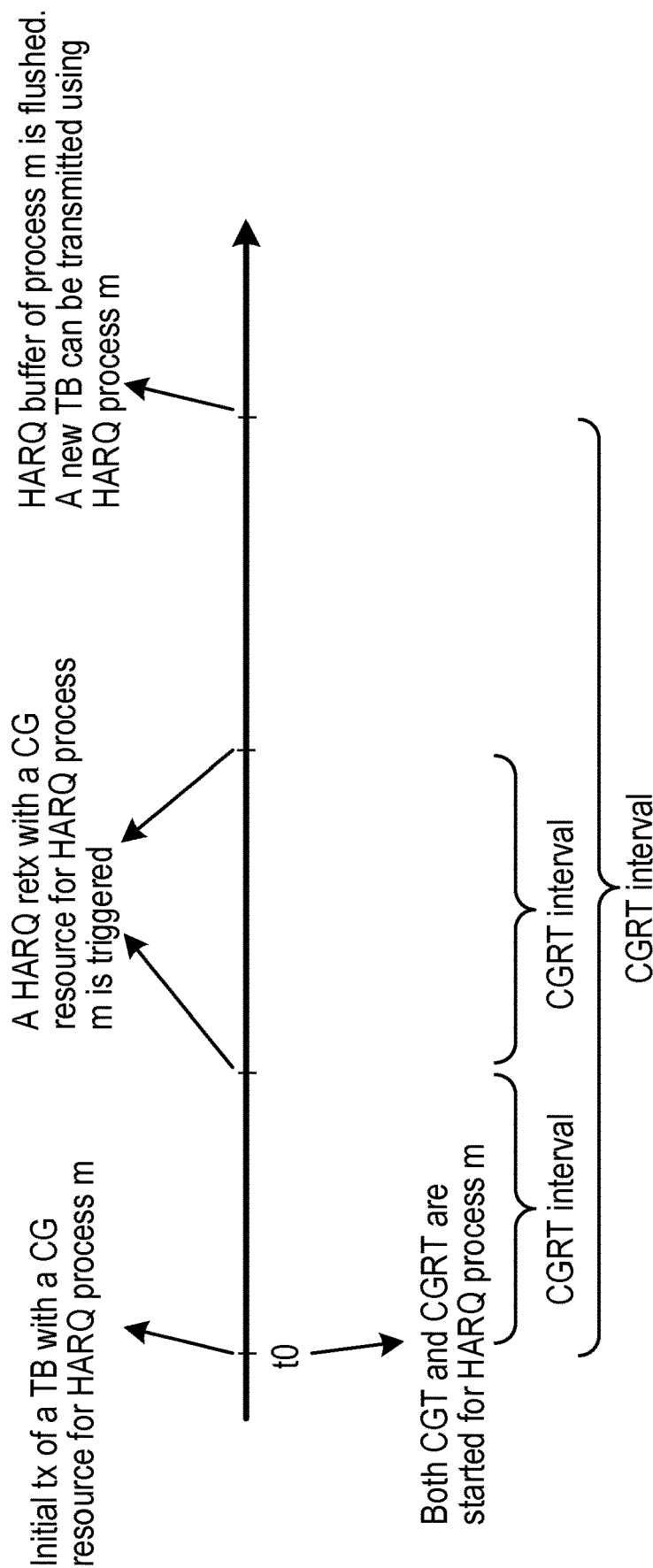
FIG. 2 is a diagram for explaining the use of a CGT.

Therefore, it is necessary to introduce a maximum limit on AUL retransmissions of a HARQ process triggered by a UE. To address this issue, a timer is configured to indicate the maximum amount of time for the UE to complete transmission of an HARQ process, i.e. when the timer expires the UE should flush the HARQ buffer for this HARQ process and transmit new data associated to it. It has been agreed to use an existing timer configuredGrantTimer (CGT) for this purpose. If both CGT and CG retransmission timer (CGRT) are configured for a HARQ process, both timers can be operated in parallel. In this way, the UE can perform HARQ retransmission using CG resources for a HARQ process while CGT is running for the process. The value of CGT should be longer than that of CG retransmission timer. The HARQ buffer is flushed at expiry of CGT. An example of the procedure is illustrated in FIG. 2.

A UE can be provided with multiple active configured grants for a given BWP in a serving cell. The introduction of multiple configured grants would serve at least for enhancing reliability and reducing latency of critical services. In addition, it is also being discussed to apply multiple configured grants for allowing the UE to switch to slot-based transmissions after initiating the channel occupancy time (COT) to minimize DMRS and uplink control information (UCI) overhead in unlicensed spectrum.

For each CG configuration, there are a number of HARQ processes in the HARQ process pool assigned. There is also a separate CGT and CGRT setting associated with each CG configuration. It is allowed to share HARQ processes between CG configurations, which can give better configuration flexibility. In addition, if each CG configuration has separate associated HARQ processes, the HARQ process space may become limited for the UE.

Since a logical channel (LCH) can be mapped to multiple CG configurations, meaning the UE can transmit the data of the LCH using multiple active CG resources at the same time. For a TB which was transmitted using a CG resource, it is allowed to use any CG resource among the set of CG resources mapped to the LCH which comes earliest in the time to perform retransmission, this can reduce the latency. In addition, the selected resource shall provide same size as the same initial TB to avoid rate-matching on the TB. In addition, the UE shall stick to the same HARQ process for transmission/retransmission of a TB.

The CGT for a HARQ process shall be only started when the TB using this HARQ process is initially transmitted. The value of the CGT is set according to the CG configuration/resource which is used for the initial transmission. In parallel, the CGRT shall be started/restarted and set to the timer value which is used for every transmission/retransmission attempt. If the initial transmission of a TB uses the resource in CG configuration 1, the CGRT is started using the timer value configured in CG configuration 1. The next retransmission of the TB is performed with the resource in CG configuration 2. The CGRT needs to be restarted and set to the timer value configured in CG configuration 2.

The HARQ process number field in the UL DCI (e.g., format 0-0 or format 0-1) scrambled by CS-RNTI is used to indicate which configuration is to be activated and which configuration(s) is/are to be released. In the DCI, NDI in the received HARQ information is 0.

Upon reception of an activation/reactivation/deactivation command, the UE provides a confirmation MAC CE to the gNB. The MAC CE contains a bitmap of CG configurations. In the bitmap field, each bit corresponds to a specific CG configuration (i.e., the bit position corresponds to the CG index)

As described in TS 38.321 V16.0.0, clause 4.5, the MAC sublayer operates on the channels defined below. Transport channels are SAPs between MAC and Layer 1, logical channels are SAPs between MAC and RLC. The MAC sublayer uses the transport channels listed in Table 2/Table 4.5.2-1 in TS 38.321 V16.0.0 below.

TABLE 2

Table 4.5.2-1: Transport channels used by MAC in TS 38.321

| Transport channel name | Acronym | Downlink | Uplink | Sidelink |
| --- | --- | --- | --- | --- |
| Broadcast Channel | BCH | X | | |
| Downlink Shared Channel | DL-SCH | X | | |
| Paging Channel | PCH | X | | |
| Uplink Shared Channel | UL-SCH | | X | |
| Random Access Channel | RACH | | X | |
| Sidelink Broadcast Channel | SL-BCH | | | X |
| Sidelink Shared Channel | SL-SCH | | | X |

The MAC sublayer provides data transfer services on logical channels. To accommodate different kinds of data transfer services, multiple types of logical channels are defined i.e. each supporting transfer of a particular type of information. Each logical channel type is defined by what type of information is transferred. The MAC sublayer provides the control and traffic channels listed in Table3/Table 4.5.3-1 in TS 38.321 V16.0.0 below.

TABLE 3

Table 4.5.3-1: Logical channels provided by MAC in TS 38.321

| Logical channel name | Acronym | Control channel | Traffic channel |
| --- | --- | --- | --- |
| Broadcast Control Channel | BCCH | X | |
| Paging Control Channel | PCCH | X | |
| Common Control Channel | CCCH | X | |
| Dedicated Control Channel | DCCH | X | |
| Dedicated Traffic Channel | DTCH | | X |
| Sidelink Broadcast Control Channel | SBCCH | X | |
| Sidelink Control Channel | SCCH | X | |
| Sidelink Traffic Channel | STCH | | X |

Each logical channel (LCH) may be allocated to a logical channel group (LCG). For each LCH or LCG in a UE, there may be a unique index configured by the gNB. The UE can use this index to identity the associated LCH or LCG.

As described in "5G Wireless Network Slicing for eMBB, URLLC, and mMTC: A Communication-Theoretic View" (Petar Popovski et al.), 5G wireless systems supports three generic services: enhanced mobile broadband (eMBB), massive machine-type communications (mMTC), and ultra-reliable and low latency communications (URLLC) (may also referred to as mission-critical communications). The eMBB supports stable connections with very high peak data rates, as well as moderate rates for cell-edge users. The mMTC supports a massive number of Internet of things (IoT) devices, which are only sporadically active and send small data payloads. The URLLC supports low-latency transmissions of small payloads with very high reliability from a limited set of terminals, which are active according to patterns typically specified by outside events, such as alarms.

The eMBB traffic can be considered to be a direct extension of the 4G broadband service. It is characterized by large payloads and by a device activation pattern that remains stable over an extended time interval. This allows the network to schedule wireless resources to the eMBB devices such that no two eMBB devices access the same resource simultaneously. The objective of the eMBB service is to maximize the data rate, while guaranteeing a moderate reliability, with packet error rate (PER) on the order of $10^{-3}$. For eMBB, the target for user plane latency should be 4 ms for UL, and 4 ms for DL.

In contrast, an mMTC device is active intermittently and uses a fixed, typically low, transmission rate in the uplink. A huge number of mMTC devices may be connected to a given base station (BS), but at a given time only an unknown (random) subset of them becomes active and attempt to send their data. The large number of potentially active mMTC devices makes it infeasible to allocate priori resources to individual mMTC devices. Instead, it is necessary to provide resources that can be shared through random access. The size of the active subset of mMTC devices is a random variable, whose average value measures the mMTC traffic arrival rate. The objective in the design of mMTC is to maximize the arrival rate that can be supported in a given radio resource. The targeted PER of an individual mMTC transmission is typically low, e.g., on the order of $10^{-1}$.

The manufacturing industry is evolving fast, and industry leaders are searching for ways to stay ahead in their factories with increased flexibility in the production automation and assembly processes while also reducing personnel safety risks.

URLLC service requires very low latency and strict latency bounds with required guarantee levels to avoid triggering safety stops in the system. This is of great significance for the industrial automation industry, as it opens the door for safe human-robot interaction, which was previously only possible over a wired network.

As described in TR 38.913 V15.0.0, URLLC service needs to fulfill the below requirements.

Control plane latency: 10 ms

User plane latency: it is the time it takes to successfully deliver an application layer packet/message from the radio protocol layer 2/3 SDU ingress point to the radio protocol layer 2/3 SDU egress point via the radio interface in both uplink and downlink directions. The requirement is 0.5 ms for both UL and DL Mobility interruption time: The requirement is 0 ms. It is the shortest time duration supported by the system during which a user terminal cannot exchange user plane packets.

Reliability: Reliability is defined as the success probability R of transmitting X bits within a certain delay at a certain channel quality (e.g. coverage-edge). A general URLLC reliability requirement for one transmission of a packet is $1-10^{-5}$ for 32 bytes with a user plane latency of 1 ms.

Multiplexing is one important function at the MAC layer, aiming to achieve a high frequency domain resource utilization avoiding padding. In the existing technical specifications, it is the logical channel prioritization (LCP) procedure that is responsible to multiplex MAC control elements and MAC SDUs according to the priority order associated with them.

On one hand, it is beneficial to achieve better resource utilization by multiplexing SDUs from different services/LCHs into the same MAC PDU to avoid padding. Note that one service is associated with one or more LCHs and one or more LCGs. On the other hand, different service/LCH may be associated with different QoS requirements in terms of latency and transmission reliability (e.g., BLER target). For a PUSCH transmission using a grant providing short transmission duration or high transmission reliability, a high priority service/LCH may be negatively impacted by a low priority service/LCH if they are multiplexed into this PUSCH transmission. Vice versa, for a grant associated with a long transmission duration or low transmission reliability, the UE may not be able to fulfill QoS requirements for a high priority service/LCH if this service/LCH is multiplexed with a low priority service/LCH into the same PUSCH transmission using this grant.

In the current technical specifications, multiplexing is a mandatory function that the UE MAC has to perform upon reception of a grant. It is possible to configure a proper LCP matching restriction to the UE so that the UE can transmit only SDUs from a LCH in a PUSCH transmission instead of multiplexing SDUs from different LCHs. In an example, if the PBR of a logical channel is set to infinity, the MAC entity shall allocate resources for all the data that is available for transmission on the logical channel before meeting the PBR of the lower priority logical channel(s).

It would be beneficial to apply service specific scheduling. This can give better differentiated QoS treatment. However, the current scheduling signaling (dynamic scheduling or configured scheduling) is not able to support service specific scheduling. Therefore, it is necessary to study how to enhance the existing scheduling signaling to support service specific scheduling.

The present disclosure proposes an improved solution for uplink transmission. The basic idea of the disclosure is that whether or not a UE shall skip LCP procedure is configured/signaled per service/LCH/LCG. The UE may be signaled to skip the LCP procedure, or the UE may only allocate resources to specific services/LCHs/LCGs upon reception of an uplink grant. If the gNB signals the UE, for an uplink grant, that multiple services/LCHs/LCGs are allowed to use the grant, the UE may allocate resources to these services/LCHs/LCGs according to LCP procedure.

The solution of the disclosure may be applied to a communication system including a terminal device and an access network node. For example, the access network node may be a base station such as a gNB in NR. The terminal device can communicate through a radio access communication link with the base station. The base station can provide radio access communication links to terminal devices that are within its communication service cell. Note that the communications may be performed between the terminal device and the base station according to any suitable communication standards and protocols.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the improved solution for uplink transmission. As the first embodiment, a dynamic scheduling signaling (e.g., DCI) not only carries at least one uplink grant, but also carries at least one indicator indicating a specific service/LCH/LCG whose data is intended to be transmitted using this (these) uplink grants. This means an uplink grant in the signaling may be used by a service/LCH/LCG, and at the same time, another uplink grant in the signaling may be used by another different service/LCH/LCG. The other services/LCHs/LCGs which are not indicated by the dynamic scheduling signaling are not allowed to use this (these) uplink grants. In this way, a mechanism can be provided for signaling whether multiplexing is configured for a specific service/LCH/LCG.

As the second embodiment, a dynamic scheduling signaling (e.g., DCI) not only carries at least one uplink grant, but also carries at least one indicator indicating a specific service/LCH/LCG whose data is intended to be transmitted using this (these) uplink grants. The indicator may be an index of an entry in a table which contains all services/LCHs/LCGs configured to the UE. The table may be configured to the UE by the gNB via system information, dedicated RRC signaling, MAC CE. This table may be cell specific or UE specific. Alternatively, this table is captured in a technical specification in a hard-coded fashion.

As the third embodiment, a dynamic scheduling signaling (e.g., DCI) not only carries at least one uplink grant, but also carries one indicator indicating that the UE can transmit data from any service/LCH/LCG using this (these) uplink grants. As an option, this indicator may be a specific index or value in the table which indicates "all services/LCHs/LCGs". As another option, the absence of the above indicators in the dynamic scheduling signaling means that the UE can transmit data from any service/LCH/LCG using this (these) uplink grants. With the above three embodiments, the MAC layer multiplexing functionality of the UE can be controlled by the gNB per slot/TTI basis, which gives the greatest flexibility. Note that it is also possible to additionally provide an indication bit indicating whether the UE shall skip LCP.

As the fourth embodiment, for a single dynamic scheduling signaling (e.g., DCI) carrying multiple grants, there may be multiple indicators carried in the signaling. Each indicator is associated with a different grant, indicating whether specific services/LCHs/LCGs can be transmitted using this uplink grant or any service/LCH/LCG can be transmitted using this grant.

As the fifth embodiment, multiple services/LCHs/LCGs may be indicated for a single grant. In this case, the UE MAC shall transmit data from all indicated services/LCHs/LCGs using the grant. In this case, a bitmap field may be introduced in the dynamic scheduling signaling (e.g., DCI). The bitmap field contains multiple bits. Each bit corresponds to a specific service/LCH/LCG. For example, the i-th bit corresponds to the service/LCH/LCG associated with the index i. The bit with value '1' means that the corresponding service/LCH/LCG is allowed to use the grant, while the bit with value '0' means that the corresponding service/LCH/LCG is not allowed to use the grant.

As the sixth embodiment, similar as any of the above embodiments for the dynamic scheduling, for a configured grant (CG) configuration, indicators indicating whether specific services/LCHs/LCGs are allowed to use this configured grant are included in the CG configuration. In case a DCI based CG activation command is sent to the UE by the gNB, the DCI carries indicators indicating whether specific services/LCHs/LCGs are allowed to use this configured grant.

As the seventh embodiment, for every uplink grant (e.g., dynamic grant or configured grant), the UE performs actions to build a corresponding MAC PDU according to the indicators associated with the grant. In case only a specific service/LCH/LCG is indicated to use the grant, the UE MAC only allocates the resources to the indicated service/LCH/LCG and builds a corresponding MAC PDU. In case there are multiple services/LCHs/LCGs indicated to use the grant, the UE MAC allocates resources to these services/LCHs/LCGs and builds a corresponding MAC PDU according to LCP procedure. In case the indicator indicates any service/LCH/LCG can use the grant, the UE MAC allocates resources to all services/LCHs/LCGs and builds a corresponding MAC PDU according to LCP procedure. As a result, a good balance between differentiated QoS treatment and resource utilization improvement can be achieved.

Note that for any of the above cases, there may be some LCHs to which the UE cannot allocate resources although they have data available and they are allowed to use the grant according to the indicators. This may occur due to that these LCHs cannot fulfill certain LCP mapping restriction.

Figures 3, 4A:
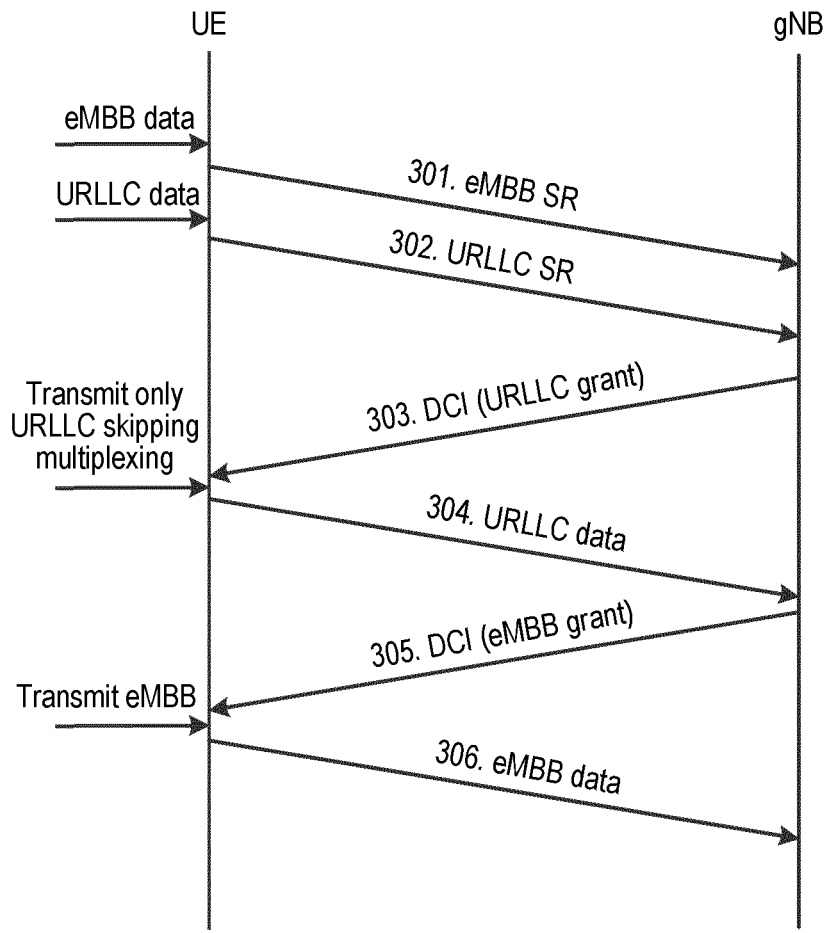
FIG. 3 is a flowchart illustrating an exemplary process according to an embodiment of the disclosure.
FIG. 4A is a flowchart illustrating a method performed by a base station according to an embodiment of the disclosure.

As an exemplary example, the proposed service specific multiplexing control procedure is illustrated in FIG. 3. At block 301, the UE sends an eMBB scheduling request (SR) to the gNB. At block 302, the UE sends a URLLC SR to the gNB. At block 303, the gNB sends, to the UE, a DCI carrying an uplink grant and indicating that URLLC service can be transmitted with the uplink grant. At block 304, the UE skips multiplexing and transmits only URLLC data to the gNB. At block 305, the gNB sends, to the UE, a DCI carrying an uplink grant and indicating that eMBB service can be transmitted with the uplink grant. At block 306, the UE transmits eMBB data to the gNB.

As the eighth embodiment, the gNB is able to perform link adaptation (LA) per service/LCH/LCG basis. In this way, there is independent LA procedure per service/LCH/LCG. Each procedure has different LA parameters (such as BLER target, MCS table etc).

As the ninth embodiment, the UE is configured to perform power control per service/LCH/LCG basis. In this way, there is independent power control procedure per service/LCH/LCG. Each procedure has different power control parameters (such as alpha value, P0 value etc).

Hereinafter, the solution will be further described with reference to FIGS. 4-16. FIG. 4A is a flowchart illustrating a method performed by a base station according to an embodiment of the disclosure. At block 404, the base station sends, to a terminal device served by the base station, a signaling comprising one or more uplink grants. The signaling indicates or implies which service or services are allowed to use the one or more uplink grants. With the method of FIG. 4A, service specific scheduling can be supported to control the multiplexing functionality performed by the terminal device. As mentioned above, in the case where the number of the one or more uplink grants may be more than one, at least two of the more than one uplink grants may be used by different services.

Note that if a specific service (e.g. URLLC) has multiple service levels depending on different QoS requirements, the term service may refer to a certain one of the multiple service levels. Since a service may correspond to one or more logical channels (LCHs) and one logical channel group (LCG) may correspond to one or more services, each of the service or services allowed to use the one or more uplink grants may be associated with a LCH/LCG or LCHs/LCGs. Thus, although the service or services are described as the object(s) indicated or implied by the signaling hereinafter, the below description about the service or services may also apply to LCH(s)/LCG(s).

There may be two options for implementing block 404. As the first option, the signaling may be a dynamic scheduling signaling. For example, the dynamic scheduling signaling may be a DCI. As the second option, the signaling may be a configured grant signaling. For configured grant scheduling scheme Type 1, the configured grant signaling may be an RRC signaling containing a configured grant configuration. For configured grant scheduling scheme Type 2, the configured grant signaling may be a DCI activation signaling.

For either one of the above two options, the following solutions may be used for indicating or implying the service or services. As the first solution, the signaling may imply that all services are allowed to use the one or more uplink grants, by an absence of one or more indicators indicating which service or services are allowed to use the one or more uplink grants.

As the second solution, the signaling may comprise one or more indicators indicating which service or services are allowed to use the one or more uplink grants. In a first example, one of the one or more indicators may indicate a specific service that is allowed to use the one or more uplink grants. In a second example, the number of the one or more indicators is one and the one indicator may indicate that all services are allowed to use the one or more uplink grants. For instance, the one indicator in the above first and second examples may be an index of an entry in a table preconfigured to the terminal device and the table may contain all services configured to the terminal device. The table may be preconfigured to the terminal device via one of: system information; dedicated RRC signaling; MAC CE; and being hardcoded in the terminal device.

In a third example, one of the one or more indicators may indicate multiple services that are allowed to use one of the one or more uplink grants. For instance, the one indicator may be a bitmap comprising multiple bits. For each of the multiple services, there may be a corresponding bit in the bitmap. One of binary values (0 and 1) that is taken by a bit may indicate that the corresponding service is allowed to use the one uplink grant. The other of the binary values that is taken by the bit may indicate that the corresponding service is not allowed to use the one uplink grant.

In a fourth example, the number of the one or more uplink grants may be more than one. Each of the one or more indicators may be associated with one of the more than one uplink grants and indicate which service or services are allowed to use the uplink grant.

Figure 4B:
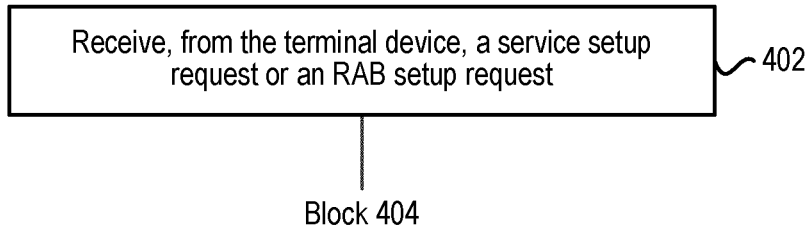
FIG. 4B is a flowchart illustrating a method performed by a base station according to an embodiment of the disclosure.

FIG. 4B is a flowchart illustrating a method performed by a base station according to an embodiment of the disclosure. As shown, the method comprises block 402 and block 404 described above. At block 402, the base station receives, from a terminal device served by the base station, a service setup request or a radio access bearer (RAB) setup request. At block 404, the base station sends, to the terminal device, a signaling comprising one or more uplink grants. The signaling indicates or implies which service or services are allowed to use the one or more uplink grants. The method of FIG. 4B applies for both the case of dynamic scheduling signaling and the case of configured grant signaling.

As another embodiment, the present disclosure provides a method performed by a base station. At a first step, the base station receives, from a terminal device served by the base station, a scheduling request for an uplink transmission. For example, the scheduling request may indicate a requirement for uplink grant on one or more services. At a second step, the base station sends, to the terminal device, a signaling comprising one or more uplink grants. The signaling indicates or implies which service or services are allowed to use the one or more uplink grants. This method only applies for the case of dynamic scheduling signaling. Note that the indicated or implied service or services may be the same as or different than the one or more services indicated in the scheduling request.

Figure 5:
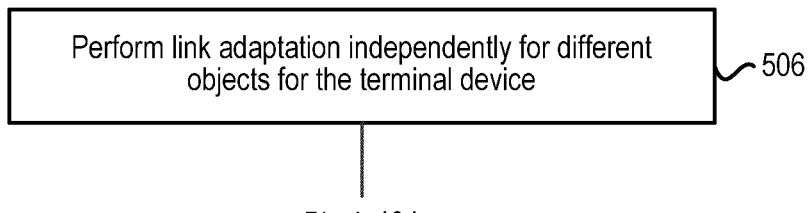
FIG. 5 is a flowchart illustrating a method performed by a base station according to an embodiment of the disclosure.

FIG. 5 is a flowchart illustrating a method performed by a base station according to an embodiment of the disclosure. As shown, the method comprises blocks 506 and 404. At block 506, the base station performs link adaptation (LA) independently for different services for the terminal device. At block 404, the base station sends, to the terminal device, a signaling comprising one or more uplink grants. The signaling indicates or implies which service or services are allowed to use the one or more uplink grants. For example, suppose the base station schedules service A and service B. Then, the base station may get LA information from the LA procedure A and B. The LA information may comprise modulation and coding scheme (MCS) selected from the MCS table for service A and B. The base station may then send a signaling (e.g. DCI) carrying the LA information with indicators indicating service A and B.

Figure 6A:
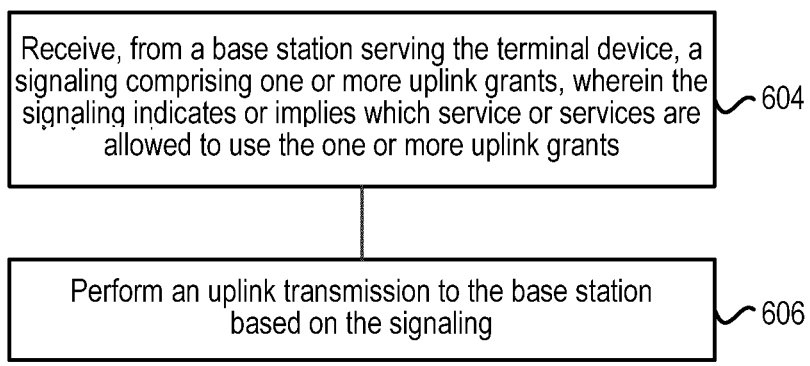
FIG. 6A is a flowchart illustrating a method performed by a terminal device according to an embodiment of the disclosure.

FIG. 6A is a flowchart illustrating a method performed by a terminal device according to an embodiment of the disclosure. At block 604, the terminal device receives, from a base station serving the terminal device, a signaling comprising one or more uplink grants. The signaling indicates or implies which service or services are allowed to use the one or more uplink grants. Block 604 corresponds to block 404 and its details are omitted here. As mentioned above, in the case where the number of the one or more uplink grants may be more than one, at least two of the more than one uplink grants may be used by different services. At block 606, the terminal device performs an uplink transmission to the base station based on the signaling. With the method of FIG. 6A, service specific scheduling can be supported to control the multiplexing functionality performed by the terminal device.

For example, block 606 may be implemented as including block 708 and optionally block 710. At block 708, the terminal device determines, from the indicated or implied service or services, at least one target service which is to be allocated with resources indicated by the one or more uplink grants. Depending on the service or services indicated or implied by the signaling, there may be three cases. In the first case, the signaling indicates that a specific service is allowed to use the one or more uplink grants. For this case, the specific service may be determined as the at least one target service. In the second case, the signaling indicates that multiple services are allowed to use the one or more uplink grants. For this case, the at least one target service may be determined by performing LCP procedure on the multiple services. In the third case, the signaling indicates or implies that all services can be transmitted with the one or more uplink grants. For this case, the at least one target service may be determined by performing LCP procedure on the all services. Optionally, if the number of the at least one target service is more than one, the terminal device may perform power control independently for different target services in the more than one target services at block 710.

Figure 6B:
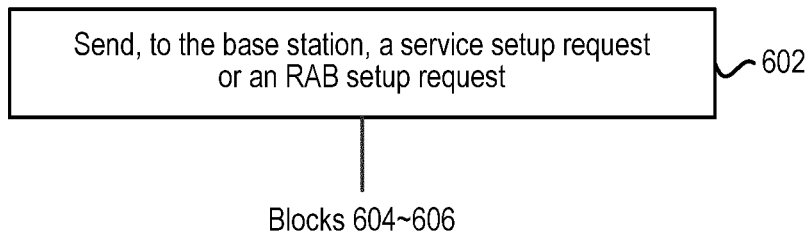
FIG. 6B is a flowchart illustrating a method performed by a terminal device according to an embodiment of the disclosure.
Figure 7:
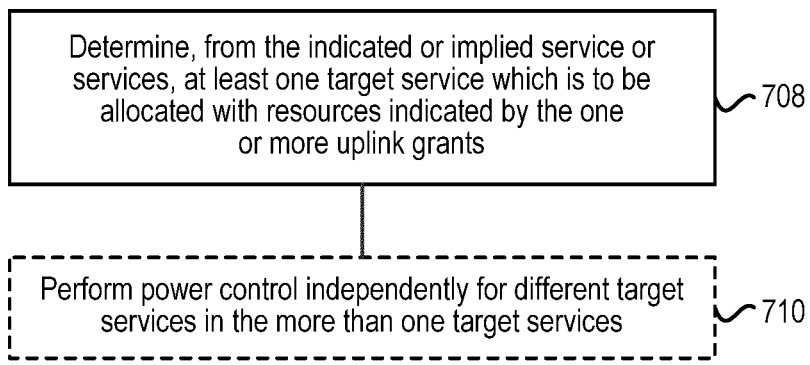
FIG. 7 is a flowchart for explaining the method of FIG. 6A.

FIG. 6B is a flowchart illustrating a method performed by a terminal device according to an embodiment of the disclosure. As shown, the method comprises block 602 and blocks 604-606 described above. At block 602, the terminal device sends, to a base station serving the terminal device, a service setup request or an RAB setup request. At block

604, the terminal device receives, from the base station, a signaling comprising one or more uplink grants. The signaling indicates or implies which service or services are allowed to use the one or more uplink grants. At block 606, the terminal device performs an uplink transmission to the base station based on the signaling. The method of FIG. 6B applies for both the case of dynamic scheduling signaling and the case of configured grant signaling.

As another embodiment, the present disclosure provides a method performed by a terminal device. At a first step, the terminal device sends, to a base station serving the terminal device, a scheduling request for an uplink transmission. At a second step, the terminal device receives, from the base station, a signaling comprising one or more uplink grants. The signaling indicates or implies which service or services are allowed to use the one or more uplink grants. At block 606, the terminal device performs an uplink transmission to the base station based on the signaling. This method only applies for the case of dynamic scheduling signaling.

Based on the above description, at least one aspect of the disclosure provides a method implemented in a communication system including a base station and a terminal device. The method may comprise, at the base station, sending, to the terminal device served by the base station, a signaling comprising one or more uplink grants. The signaling may indicate or imply which service or services are allowed to use the one or more uplink grants. The method may further comprise, at the terminal device, receiving, from the base station, the signaling comprising the one or more uplink grants. The signaling may indicate or imply which service or services are allowed to use the one or more uplink grants. The method may further comprise, at the terminal device, performing an uplink transmission to the base station based on the signaling.

Figure 8:
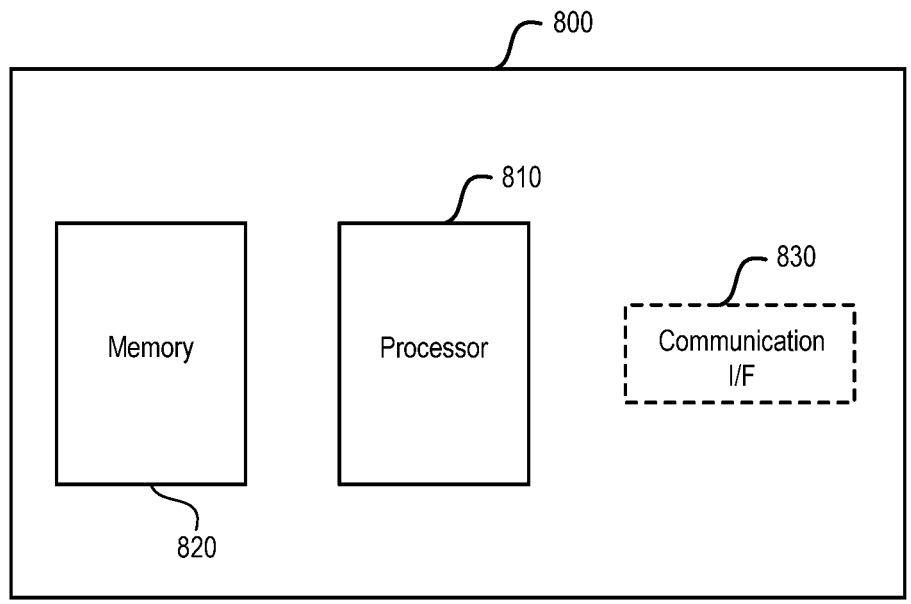
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the base station and the terminal device described above may be implemented through the apparatus 800. As shown, the apparatus 800 may include a processor 810, a memory 820 that stores a program, and optionally a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
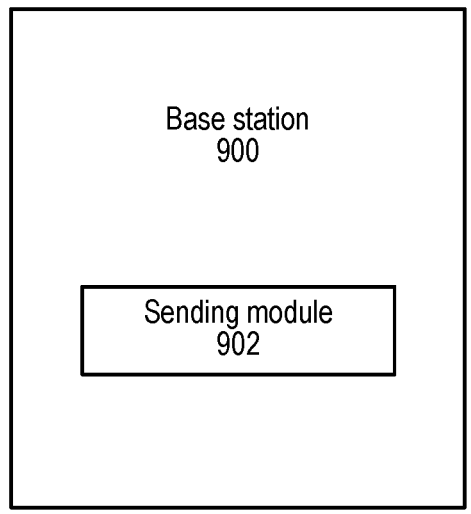
FIG. 9 is a block diagram showing a base station according to an embodiment of the disclosure.

FIG. 9 is a block diagram showing a base station according to an embodiment of the disclosure. As shown, the base station 900 comprises a sending module 902. The sending module 902 may be configured to send, to a terminal device served by the base station, a signaling comprising one or more uplink grants, as described above with respect to block 404. The signaling may indicate or imply which service or services are allowed to use the one or more uplink grants.

Figure 10:
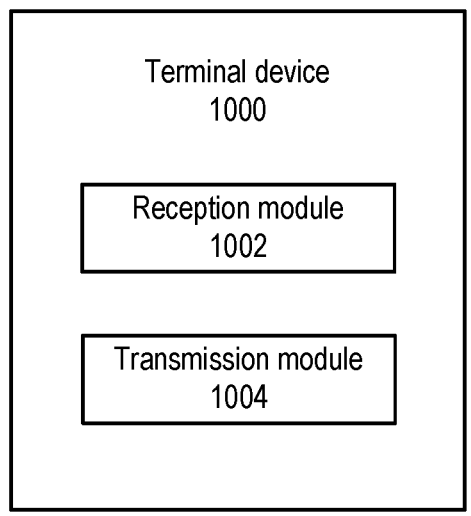
FIG. 10 is a block diagram showing a terminal device according to an embodiment of the disclosure.

FIG. 10 is a block diagram showing a terminal device according to an embodiment of the disclosure. As shown, the terminal device 1000 comprises a reception module 1002 and a transmission module 1004. The reception module 1002 may be configured to receive, from a base station serving the terminal device, a signaling comprising one or more uplink grants, as described above with respect to block 604. The signaling may indicate or imply which service or services are allowed to use the one or more uplink grants. The transmission module 1004 may be configured to perform an uplink transmission to the base station based on the signaling, as described above with respect to block 606. The modules described above may be implemented by hardware, or software, or a combination of both.

Based on the above description, at least one aspect of the disclosure provides a communication system. The communication system may comprise a base station configured to send, to a terminal device served by the base station, a signaling comprising one or more uplink grants. The signaling may indicate or imply which service or services are allowed to use the one or more uplink grants. The communication system may further comprise the terminal device configured to: receive, from the base station, the signaling comprising the one or more uplink grants, wherein the signaling indicates or implies which service or services are allowed to use the one or more uplink grants; and perform an uplink transmission to the base station based on the signaling.

Figure 11:
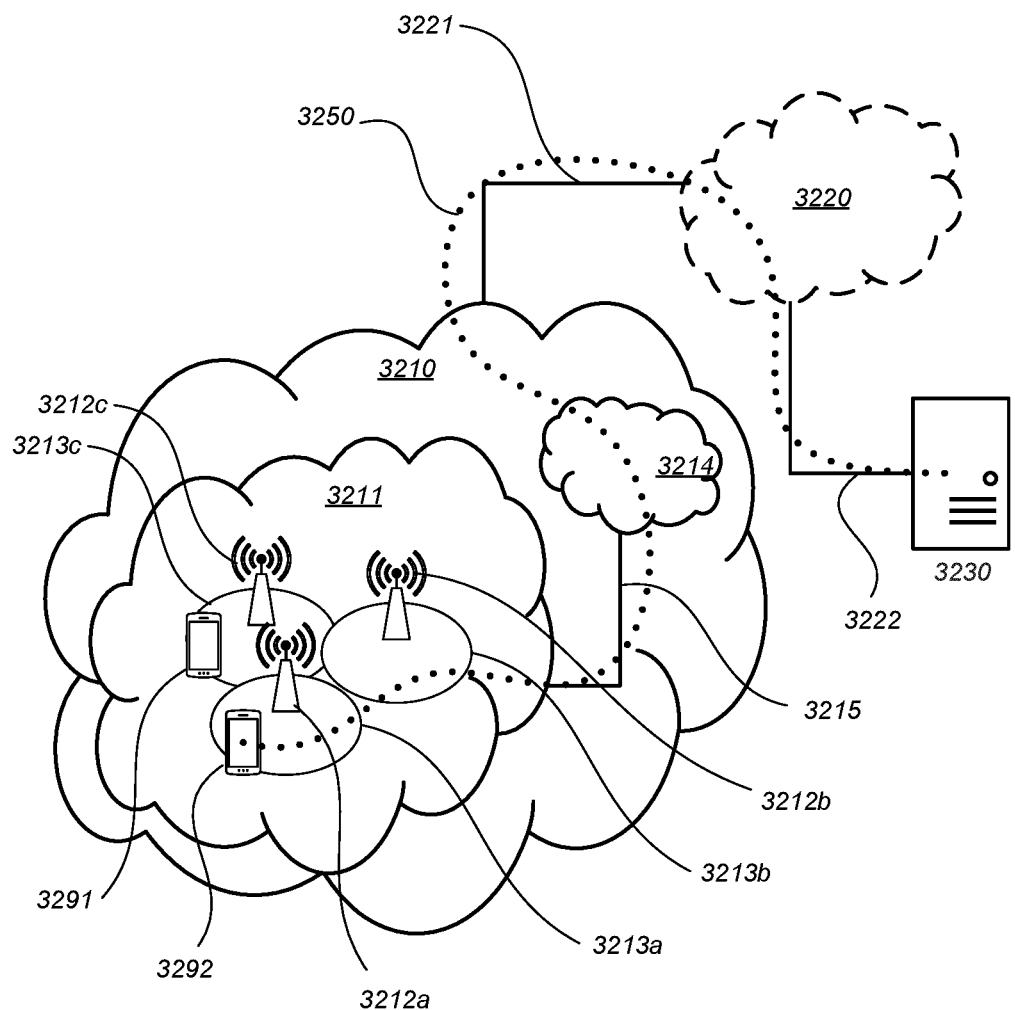
FIG. 11 is a diagram showing a telecommunication network connected via an intermediate network to a host computer in accordance with some embodiments.

With reference to FIG. 11, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 11 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 12) served by base station 3320. Communication interface 3326 may be configured to facilitate connection 3360 to host computer 3310. Connection 3360 may be direct or it may pass through a core network (not shown in FIG. 12) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 12:
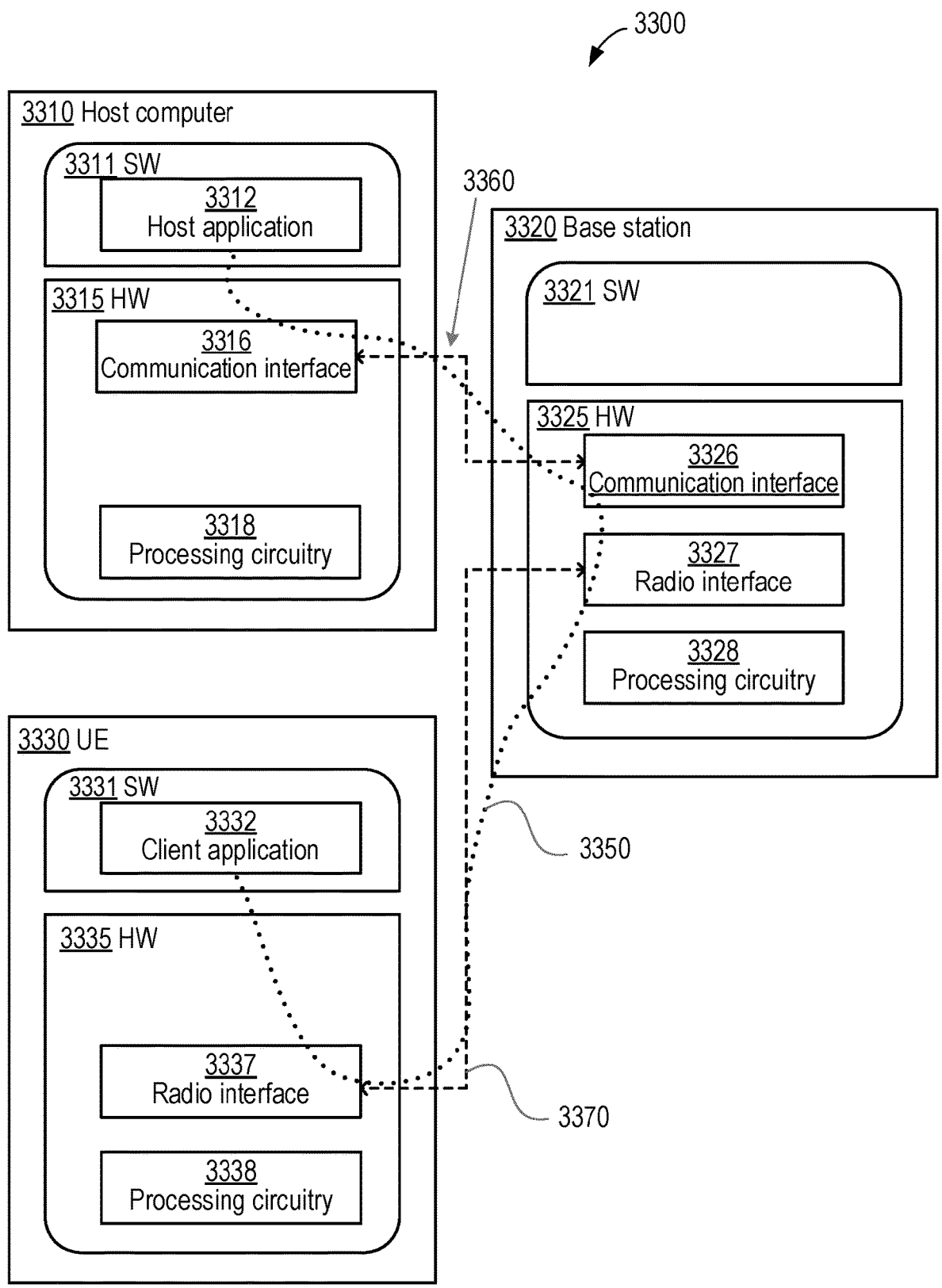
FIG. 12 is a diagram showing a host computer communicating via a base station with a user equipment in accordance with some embodiments.

It is noted that host computer 3310, base station 3320 and UE 3330 illustrated in FIG. 12 may be similar or identical to host computer 3230, one of base stations 3212a, 3212b, 3212c and one of UEs 3291, 3292 of FIG. 11, respectively. This is to say, the inner workings of these entities may be as shown in FIG. 12 and independently, the surrounding network topology may be that of FIG. 11.

In FIG. 12, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 13:
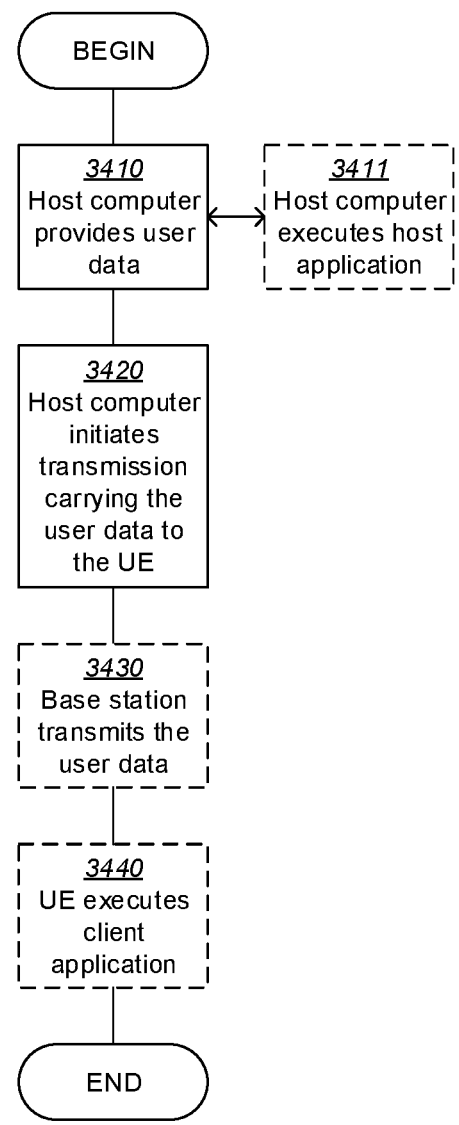
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 14:
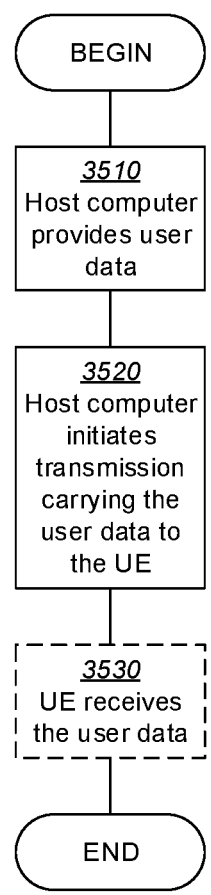
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 15:
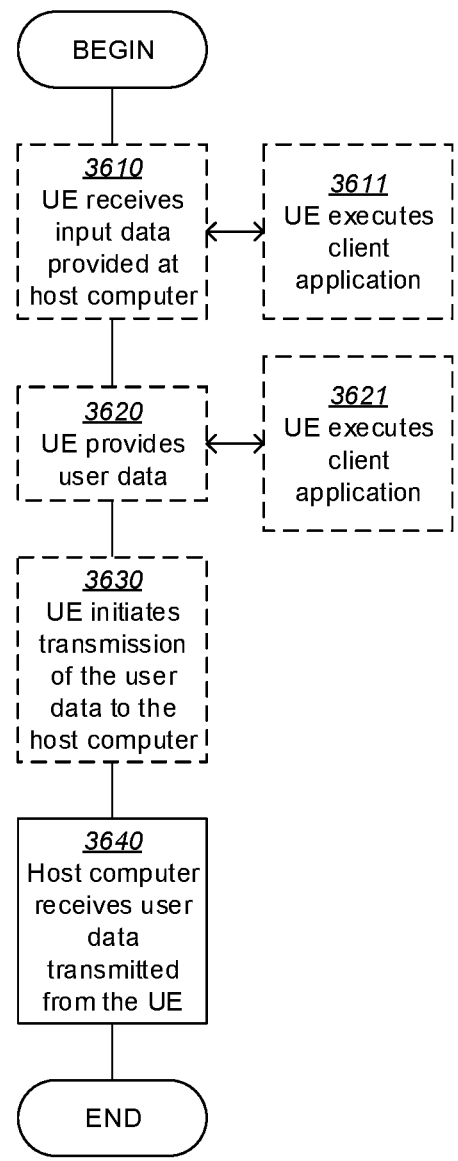
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 16:
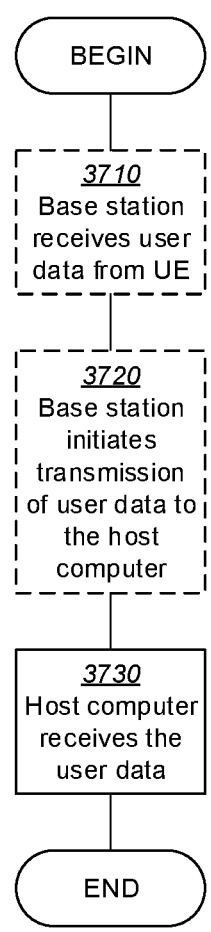
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may send, to a terminal device served by the base station, a signaling comprising one or more uplink grants. The signaling may indicate or imply which service or services are allowed to use the one or more uplink grants.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to send, to a terminal device served by the base station, a signaling comprising one or more uplink grants. The signaling may indicate or imply which service or services are allowed to use the one or more uplink grants.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The terminal device may receive, from a base station serving the terminal device, a signaling comprising one or more uplink grants. The signaling may indicate or imply which service or services are allowed to use the one or more uplink grants. The terminal device may further perform an uplink transmission to the base station based on the signaling.

In an embodiment of the disclosure, the method may further comprise, at the terminal device, receiving the user data from the base station.

According to another aspect of the disclosure, there is provided a communication system including a host computer comprising processing circuitry configured to provide user data and a communication interface configured to forward user data to a cellular network for transmission to a terminal device. The terminal device may comprise a radio interface and processing circuitry. The processing circuitry of the terminal device may be configured to receive, from a base station serving the terminal device, a signaling comprising one or more uplink grants. The signaling may indicate or imply which service or services are allowed to use the one or more uplink grants. The processing circuitry of the terminal device may be further configured to perform an uplink transmission to the base station based on the signaling.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The processing circuitry of the terminal device may be configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method performed by a base station comprising:
sending, to a terminal device served by the base station, a signaling comprising one or more uplink grants, wherein the signaling comprises one or more indicators indicating which service or services are allowed to use the one or more uplink grants, wherein each of the service or services allowed to use the one or more uplink grants is associated with a logical channel or logical channel group;
wherein one of the one or more indicators indicates multiple services that are allowed to use one of the one or more uplink grants;
wherein the one indicator is a bitmap comprising multiple bits; and
wherein for each of the multiple services there is a corresponding bit in the bitmap.

2. The method according to claim 1, wherein a number of the one or more uplink grants is more than one, and at least two of the more than one uplink grants are to be used by different services.

3. The method according to claim 1, wherein the signaling is a dynamic scheduling signaling.

4. The method according to claim 1, wherein the signaling is a configured grant signaling, wherein the configured grant signaling is a Downlink Control Information, DCI, activation signaling.

5. The method according to claim 1, wherein the signaling implies that all services are allowed to use the one or more uplink grants, by an absence of one or more indicators indicating which service or services are allowed to use the one or more uplink grants.

6. The method according to claim 1, wherein the signaling comprises one or more indicators indicating which service or services are allowed to use the one or more uplink grants.

7. The method according to claim 6, wherein one of the one or more indicators indicates a specific service that is allowed to use the one or more uplink grants.

8. The method according to claim 7, wherein the one indicator is an index of an entry in a table preconfigured to the terminal device, the table containing all services configured to the terminal device.

9. The method according to claim 8, wherein the table is preconfigured to the terminal device via one of:
system information;
dedicated Radio Resource Control, RRC, signaling;
medium access control, MAC, control element, CE; and
being hardcoded in the terminal device.

10. The method according to claim 1, further comprising:
performing link adaptation independently for different services for the terminal device.

11. A method performed by a terminal device comprising:
receiving, from a base station serving the terminal device, a signaling comprising one or more uplink grants, wherein the signaling comprises one or more indicators indicating which service or services are allowed to use the one or more uplink grants wherein one of the one or more indicators indicates multiple services that are allowed to use one of the one or more uplink grants, wherein the one indicator is a bitmap comprising multiple bits, and wherein for each of the multiple services there is a corresponding bit in the bitmap; and
performing an uplink transmission to the base station based on the signaling,
wherein each of the service or services allowed to use the one or more uplink grants is associated with a logical channel or logical channel group.

12. The method according to claim 11, wherein a number of the one or more uplink grants is more than one, and at least two of the more than one uplink grants are to be used by different services.

13. The method according to claim 11, wherein the signaling is a dynamic scheduling signaling.

14. The method according to claim 11, wherein the signaling is a configured grant signaling, wherein the configured grant signaling is a DCI activation signaling.

15. The method according to claim 11, wherein the signaling implies that all services are allowed to use the one or more uplink grants, by an absence of one or more indicators indicating which service or services are allowed to use the one or more uplink grants.

16. The method according to claim 11, wherein the signaling comprises one or more indicators indicating which service or services are allowed to use the one or more uplink grants.

17. A base station comprising:
at least one processor; and
at least one memory, the at least one memory containing instructions executable by the at least one processor, whereby the base station is operative to:
send, to a terminal device served by the base station, a signaling comprising one or more uplink grants, wherein the signaling comprises one or more indicators indicating which service or services are allowed to use the one or more uplink grants, wherein each of the service or services allowed to use the one or more uplink grants is associated with a logical channel or logical channel group;
wherein one of the one or more indicators indicates multiple services that are allowed to use one of the one or more uplink grants;
wherein the one indicator is a bitmap comprising multiple bits; and
wherein for each of the multiple services there is a corresponding bit in the bitmap.

18. A terminal device comprising:
at least one processor; and
at least one memory, the at least one memory containing instructions executable by the at least one processor, whereby the terminal device is operative to:
receive, from a base station serving the terminal device, a signaling comprising one or more uplink grants, wherein the signaling comprises one or more indicators indicating which service or services are allowed to use the one or more uplink grants wherein one of the one or more indicators indicates multiple services that are allowed to use one of the one or more uplink grants, wherein the one indicator is a bitmap comprising multiple bits, and wherein for each of the multiple services there is a corresponding bit in the bitmap, wherein each of the service or services allowed to use the one or more uplink grants is associated with a logical channel or logical channel group; and
perform the uplink transmission to the base station based on the signaling.

* * * * *